US006873990B2

(12) United States Patent
Oblinger

(10) Patent No.: US 6,873,990 B2
(45) Date of Patent: Mar. 29, 2005

(54) CUSTOMER SELF SERVICE SUBSYSTEM FOR CONTEXT CLUSTER DISCOVERY AND VALIDATION

(75) Inventor: Daniel A. Oblinger, New York, NY (US)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 09/778,149

(22) Filed: Feb. 7, 2001

(65) Prior Publication Data

US 2002/0107852 A1 Aug. 8, 2002

(51) Int. Cl.[7] .............................................. G06F 17/00
(52) U.S. Cl. ....................... 707/101; 707/102; 707/103
(58) Field of Search ............................... 707/1, 2, 3, 4, 707/5, 6, 10, 101, 102, 103

(56) References Cited

U.S. PATENT DOCUMENTS

| | | | | |
|---|---|---|---|---|
| 5,021,953 A | 6/1991 | Webber et al. | ................. | 705/6 |
| 5,237,499 A | 8/1993 | Garback | ....................... | 705/5 |
| 5,303,361 A | 4/1994 | Colwell et al. | ................ | 707/4 |
| 5,321,833 A | 6/1994 | Chang et al. | .................. | 707/5 |

(Continued)

OTHER PUBLICATIONS

Billsus, D., et al., "A Learning agent for wireless news access," Proceedings of IUI 2000: International Conference on Intelligent User Interfaces, ACM, Jan. 9–12, 2000, pp. 33–36, XP–002205011.

Olsen, K., et al., "Visualization of a document collection: The Vibe System", Information Processing & Management, Elsevier, Barking, GB, vol. 29, No. 1, 1993, pp. 69–81, XP 000574984.

Mladenic, D, "Text–learning and related intelligent agents: a survey", IEEE Intelligent Systems, IEEE, vol. 14, No. 4, Jul. 1999, pp. 44–54, XP–002205012.

Göker, A., "Capturing Information Need by Learning User Context", 16th International Joint Conferent in Artificial Intelligence: Learning About User Workshop, Jul. 31, 1999, pp. 21–27, XP–002205013.

Anonymous, "Taxonomized Web Search", IBM Technical Disclosure Bulletin, IBM Corp. New York, US, vol. 40, No. 5, May 1, 1997, pp. 195–196, XP–002133594; and.

Davies, J., et al., "Knowledge Discovery and Delivery", British Telecommunications Engineering, London, GB, vol. 17, No. 1, Apr. 1, 1998,,pp. 25–35, XP–000765546.

Primary Examiner—Shahid Alam
Assistant Examiner—Isaac Woo
(74) Attorney, Agent, or Firm—Scully, Scott, Murphy & Presser; Daniel P. Morris, Esq.

(57) ABSTRACT

A system and method for clustering user contexts in a customer self service system that performs resource search and selection. The customer self service system includes a context attribute database comprising types of user contexts and one or more context attributes associated with each user context for processing by the system, and context attribute function database comprising functions for computing values for each context attribute. The context clustering system receives user interaction data from among a database of user interaction records and a distance metric for associating closeness of the user interaction data and clusters the user interaction data according to the distance metric to determine new user contexts and associated attributes for use in subsequent resource searches initiated by users in the system. Improved user query definition and resource lookup results from the new determined user context attributes. The user interaction data comprises past and present user queries, system responses to user queries, raw context information including: one or more of static, historical context, transient context, organizational context, community context, and environment context, and, other raw context associated with the user and dependent upon that user's interaction state and customer query domain.

30 Claims, 6 Drawing Sheets

U.S. PATENT DOCUMENTS

| | | | |
|---|---|---|---|
| 5,375,244 A * | 12/1994 | McNair | 710/200 |
| 5,446,891 A | 8/1995 | Kaplan et al. | 707/2 |
| 5,524,187 A | 6/1996 | Feiner et al. | 345/419 |
| 5,546,516 A | 8/1996 | Austel et al. | 345/440 |
| 5,600,835 A | 2/1997 | Garland et al. | 707/5 |
| 5,608,899 A | 3/1997 | Li et al. | 707/4 |
| 5,619,709 A | 4/1997 | Caid et al. | 707/2 |
| 5,710,899 A | 1/1998 | Eick | 345/764 |
| 5,724,567 A | 3/1998 | Rose et al. | 707/2 |
| 5,754,939 A | 5/1998 | Herz et al. | 455/3.04 |
| 5,768,578 A | 6/1998 | Kirk et al. | 707/100 |
| 5,787,422 A | 7/1998 | Tukey et al. | 707/5 |
| 5,794,178 A | 8/1998 | Caid et al. | 345/440 |
| 5,826,260 A | 10/1998 | Byrd, Jr. et al. | 707/5 |
| 5,841,437 A | 11/1998 | Fishkin et al. | 345/619 |
| 5,850,531 A | 12/1998 | Cox et al. | 345/781 |
| 5,918,217 A | 6/1999 | Maggioncalda et al. | 705/36 |
| 5,930,501 A | 7/1999 | Neil | 345/700 |
| 5,974,412 A | 10/1999 | Hazlehurst et al. | 707/3 |
| 5,999,927 A | 12/1999 | Tukey et al. | 707/5 |
| 6,006,221 A | 12/1999 | Liddy et al. | 707/5 |
| 6,012,067 A * | 1/2000 | Sarkar | 707/103 R |
| 6,014,661 A | 1/2000 | Ahlberg et al. | 707/3 |
| 6,097,386 A | 8/2000 | Bardon et al. | 345/866 |
| 6,105,023 A | 8/2000 | Callan | 707/5 |
| 6,134,541 A * | 10/2000 | Castelli et al. | 707/2 |
| 6,173,287 B1 | 1/2001 | Eberman et al. | 707/102 |
| 6,226,408 B1 * | 5/2001 | Sirosh | 382/224 |
| 6,256,633 B1 * | 7/2001 | Dharap | 707/10 |
| 6,327,590 B1 | 12/2001 | Chidlovskii et al. | 707/5 |
| 6,347,313 B1 | 2/2002 | Ma et al. | 707/3 |
| 6,421,668 B1 * | 7/2002 | Yakhini et al. | 707/6 |
| 6,442,526 B1 | 8/2002 | Vance et al. | 705/5 |
| 6,490,577 B1 * | 12/2002 | Anwar | 707/3 |
| 6,502,091 B1 * | 12/2002 | Chundi et al. | 707/3 |
| 6,578,037 B1 | 6/2003 | Wong et al. | 707/10 |
| 6,661,431 B1 * | 12/2003 | Stuart et al. | 707/102 |
| 2001/0051958 A1 | 12/2001 | deVries et al. | 715/500.1 |
| 2002/0129015 A1 | 9/2002 | Caudill et al. | 707/6 |
| 2003/0018632 A1 | 1/2003 | Bays et al. | 707/3 |

* cited by examiner

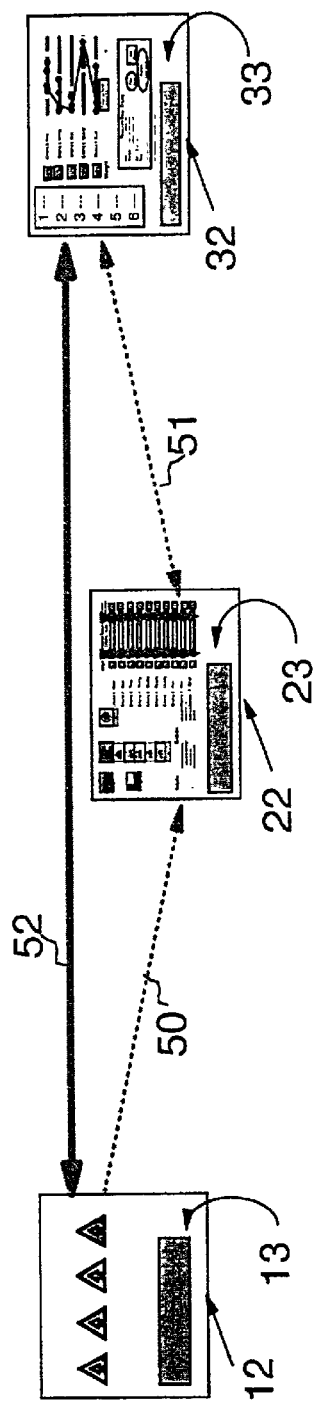

Domain Examples

| | Education (ex:Environment) | Education (ex:Subject Matter) | Real Estate | Travel |
|---|---|---|---|---|
| User Query | Learn Lotus Notes at home  61 | Become a Linux developer by June  71 | Find housing near new job by August  81 | Plan a trip to Vermont in June  91 |
| User Context | Corp Exec at HQ Remote Staffie Commuting Techie Travelling Consultant 62 | Corp Exec at HQ Remote Staffie Commuting Techie Travelling Consultant 72 | Relocating Business Professional Empty Nester College Student 82 | Single Mom w/Kids Swinging Singles Business Traveller 92 |
| Context Attribute | Connectivity Learning Mode(s) Technical Field  63 | Connectivity Learning Mode(s) Technical Field  73 | Mode of Commute to work/school Mode of Housing Maintenance Style  83 | Mode of Transportation Mode of Housing Food Style  93 |
| Attribute Value | LAN Connected DialUp DSL Disconnected  64 | Security Graphical Interfaces Programming Systems Integration  74 | Carefree living Subcontract it all Do-it-yourself-er  84 | Drive Fly Train  94 |
| Value Resource Parameters | Include: Download & Play resources  Exclude: On Line collaborative resources  65 | Include KDE  Exclude GNOME  75 | Include walls Include paint Include lawnmowing  Exclude plumbing Exclude electrical Exclude landscaping  85 | Include all major carriers  Exclude prop planes Exclude bad safety records  95 |
| Resource Selection Criteria & Values | Cost Time Quality Risk  66 | Cost Time Quality Risk  76 | Cost Time Quality Risk  86 | Cost Time Quality Risk  96 |

Figure 3

CUSTOMER SELF SERVICE SUBSYSTEM FOR CONTEXT CLUSTER DISCOVERY AND VALIDATION

BACKGROUND OF THE INVENTION

1. Field of the Invention

The present invention relates generally to customer self service systems for resource search and selection, and, more specifically, to a mechanism for applying clustering (an unsupervised machine learning technique) to a set of user interaction records to discover groups of similarly situated queries, with each discovered group comprising a possible new user context.

2. Discussion of the Prior Art

Currently there exist many systems designed to perform search and retrieval functions. These systems may be classified variously as knowledge management systems, information portals, search engines, data miners, etc. However, providing effective customer self service systems for resource search and selection presents several significant challenges. The first challenge for current systems with query capability is that serving queries intelligently requires a large amount of user supplied contextual information, while at the same time the user has limited time, patience, ability and interest to provide it. The second challenge is that searching without sufficient context results in a very inefficient search (both user time and system resource intensive) with frequently disappointing results (overwhelming amount of information, high percentage of irrelevant information). The third challenge is that much of a user's actual use and satisfaction with search results differs from that defined at the start of the search: either because the users behave contrary to their own specifications, or because there are other contextual issues at play that have not been defined into the search.

While the prior art has addressed the use of unsupervised clustering to identify user context attributes, a major limitation of these approaches, however, is that they have not based the clustering on a rich set of context identifiers. Consequently, the identified user contexts have not substantially improved the relevance of the query results based on selection of these contexts by users. Further, most of the prior art is focused on the discovery of database structure, or clustering of data within the resources, or discovering relevant taxonomy for resources as opposed to the clustering of contexts among users and user groups which can be used predictively.

As will be hereinafter explained in greater detail, some representative prior art search and retrieval systems include Feldman, Susan, "The Answering Machine," in Searcher: The Magazine for Database Professionals, 1, 8, Jan. 2000/ 58; U.S. Pat. No. 5,754,939 entitled "System for Generation of User Profiles For a System For Customized Electronic Identification of Desirable Objects"; U.S. Pat. No. 5,794,178 entitled "Visualization of Information Using Graphical Representations of Context Vector Based Relationships and Attributes"; U.S. Pat. No. 5,999,927 entitled "Method and Apparatus for Information Access Employing Overlapping Clusters"; U.S. Pat. No. 5,619,709 entitled "System and Method of Context Vector Generation and Retrieval"; U.S. Pat. No. 5,787,422 entitled "Method and Apparatus for Information Access Employing Overlapping Clusters."

For example, the article by Feldman, Susan entitled "The Answer Machine," discusses generally how the use of learning may make systems dynamic, however, the systems related to learning appear to be focused on learning a taxonomy or relationships among document categories or topics. Such learning systems may detect the rise of new terms. For example, the Semio system (http://www.semio.com/products/semiotaxonomy.html) creates taxonomies or hierarchies automatically. However, none of the systems for learning in the prior art are focused on or uses user contexts. Moreover, no system in the prior art is directed to discovering clusters in user behaviors (user context clusters).

U.S. Pat. No. 5,754,939 describes a method for customized electronic identification of desirable objects, such as news articles, in an electronic media environment, and in particular to a system that automatically constructs both a "target profile" for each target object in the electronic media based, for example, on the frequency with which each word appears in an article relative to its overall frequency of use in all articles, as well as a "target profile interest summary" for each user, which target profile interest summary describes the user's interest level in various types of target objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects that are profiled on the electronic media.

U.S. Pat. No. 5,794,178 describes a system and method for automatically generating context vectors representing conceptual relationships among information items by quantitative means for use in storage and retrieval of documents and other information items and for displaying them visually to a user. A neural network operates on a training corpus of records to develop relationship-based context vectors based on word proximity and co-importance using a technique of "windowed co-occurrence". Relationships among context vectors are deterministic, so that a context vector set has one logical solution, although it may have a plurality of physical solutions. No human knowledge, knowledge base, or conceptual hierarchy, is required. Summary vectors of records may be clustered to reduce searching time, by forming a tree of clustered nodes. Once the context vectors are determined, records may be retrieved using a query interface that allows a user to specify content terms, Boolean terms, and/or document feedback. Thus, context vectors are translated into visual and graphical representations to thereby provide user visualization of textual information and enable visual representations of meaning so that users may apply human pattern recognition skills to document searches.

U.S. Pat. No. 5,999,927 describes a method and apparatus for document clustering-based browsing of a corpus of documents, and more particularly to the use of overlapping clusters to improve recall. More particularly, it is directed to improving the performance of information access methods and apparatus through the use of non-disjoint (overlapped) clustering operations.

U.S. Pat. No. 5,619,709 is directed to a system and method for generating context vectors for use in storage and retrieval of documents and other information items. Context vectors represent conceptual relationships among information items by quantitative means. A neural network operates on a training corpus of records to develop relationship-based context vectors based on word proximity and co-importance using a technique of "windowed co-occurrence". Relationships among context vectors are deterministic, so that a context vector set has one logical solution, although it may have a plurality of physical solutions. No human knowledge, thesaurus, synonym list, knowledge base, or conceptual hierarchy, is required. Summary vectors of records may be clustered to reduce searching time, by forming a tree of clustered nodes. Once the context vectors are determined, records may be retrieved using a query interface that allows a user to specify content terms, Boolean terms, and/or document feedback. This system further facilitates visualization of textual information by translating context vectors into visual and graphical representations. Thus, a user can explore visual representations of meaning, and can apply human visual pattern recognition skills to document searches. However, no teaching is provided for finding and clustering user contexts.

U.S. Pat. No. 5,787,422 is directed to a method and apparatus for document clustering-based browsing of a corpus of documents, and more particularly to the use of overlapping clusters to improve recall. The present invention is directed to improving the performance of information access methods and apparatus through the use of non-disjoint (overlapped) clustering operations.

It would be highly desirable to provide for a customer self service system an automatic clustering process that discovers related queries and enables the generation of new relevant context terms and corresponding icons used to describe the users and their interactive situations.

It would also be highly desirable to suggest new contexts for the administrator to label and build an icon for, thus providing a semi-automated process involving explicit administrator control.

SUMMARY OF THE INVENTION

It is an object of the present invention to provide for a customer self service system an automatic clustering process for discovering related queries for resources out of a database, and infer similar users' context.

It is a further object of the present invention to provide for a customer self service system a mechanism for determining what types of contexts are relevant for a particular database of resources that are served up to the users.

It is another object of the present invention to provide for a customer self service system an automatic clustering process that discovers related queries and enables the generation of new relevant context terms and corresponding icons used to describe the users and their interactive situations.

It is yet another object of the present invention to apply clustering (an unsupervised machine learning technique) to a set of user interaction records to discover groups of similarly situated queries.

It is still another object of the present invention to provide for a customer self service system a semi-automated method for suggesting new contexts for an administrator to label and build an icon for.

According to the invention, there is provided a system and method for clustering user contexts in a customer self service system that performs resource search and selection. The customer self service system includes a context attribute database comprising types of user contexts and one or more context attributes associated with each user context for processing by the system, and context attribute function database comprising functions for computing values for each context attribute. For clustering user contexts, the context clustering system receives user interaction data from among a database of user interaction records and a distance metric for associating closeness of the user interaction data and clusters the user interaction data according to the distance metric to determine new user contexts and associated attributes for use in subsequent resource searches initiated by users in the system. Improved user query definition and resource lookup results from the new determined user context attributes. The user interaction data comprises past and present user queries, system responses to user queries, raw context information including: one or more of static, historical context, transient context, organizational context, community context, and environment context, and, other raw context associated with the user and dependent upon that user's interaction state and customer query domain.

Advantageously, such a system and method of the invention is applicable for a customer self service system in a variety of customer query domains including domains such as education, real estate and travel.

BRIEF DESCRIPTION OF THE DRAWINGS

Further features, aspects and advantages of the apparatus and methods of the present invention will become better understood with regard to the following description, appended claims, and the accompanying drawings where:

FIG. 2 is a flowchart showing the generic process steps of the user's interaction with the customer self service system through the iconic interfaces of the system.

FIG. 3 provides examples of data elements from the education, real estate and travel domains given example user interactions with the customer self service system via the iconic interfaces.

DETAILED DESCRIPTION OF THE PREFERRED EMBODIMENTS

Figure 1:
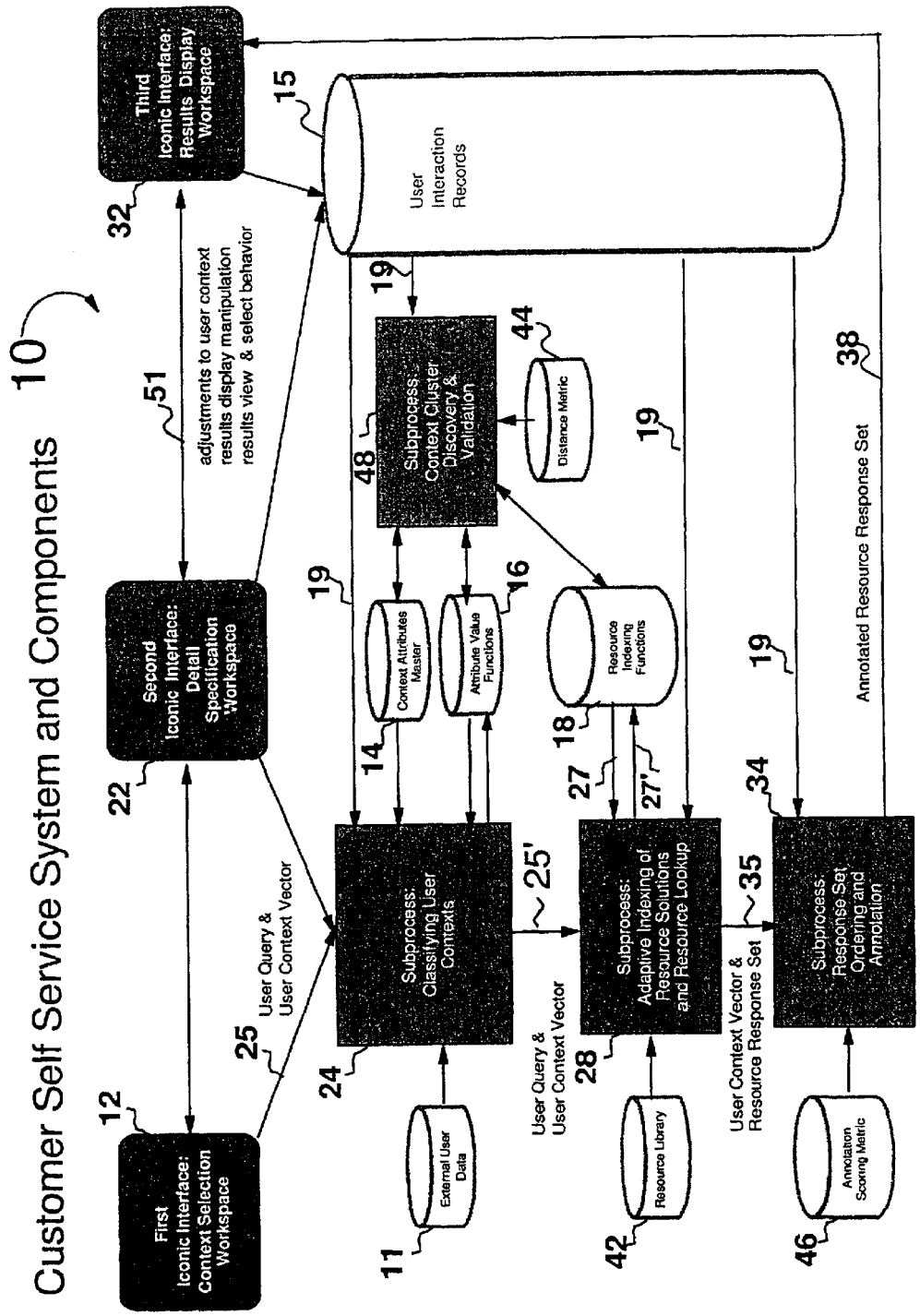
FIG. 1 is a flowchart showing the steps of the control flow between the component inventions included in the generic preferred embodiment of the customer self service system.

FIG. 1 illustrates a customer self service system ("system") 10 which is described in detail commonly-owned, U.S. patent application Ser. No. 09/778,146, now U.S. Pat. No. 6,701,311 filed Jul. 21, 2004, entitled CUSTOMER SELF SERVICE SYSTEM FOR RESOURCE SEARCH AND SELECTION the contents and disclosure of which are incorporated by reference as if fully set forth herein. The system 10 is a comprehensive self service system providing an end-to-end solution that integrates the user and system, the content and context, and, the search and result so that the system may learn from each and all users and make that learning operationally benefit all users over time. The present invention comprises a particular aspect of this system that focuses on applying unsupervised (machine) learning to cluster user interaction records and to assist in the identification of new user contexts, attribute functions and resource indexing functions.

Particularly, as shown in FIG. 1, the self service system provides a three-part intuitive iconic interface comprising interface components 12, 22 and 32 for visualizing and exploring the set of resources that the system has found to match the user's initial query and related subject and context variables. The system 10 preferably enables the expression of a user's context as part of the query and expresses the relevance of the results to a particular user via the interface in terms beyond that of the results' content. The resource set is presented to the user in a way which clearly illustrates their degree of fit with the user's most important context variables, as indicated by their prior usage of the system, as well as by context choices for the current query. The system displays the resources in the sequence specified by the user and enables the user to select and weight the criteria to be used in interpreting and selecting between resources. This provides a shifting of the user's focus from finding something, to making choices among the set of resources available. Via the interface components 12, 22 and 32, the user may redefine their query, preview some or all of the suggested resources or further reduce, and redisplay the response set to extract those with the best degree of fit with that user's current needs. The system generates and displays via the interface a listing of the currently active inclusionary and exclusionary content filters and provides a means for modifying them. More specifically, the intuitive user interface of the invention enables users to specify the variables of their resource needs.

FIG. 2 particularly depicts reduced-size displays illustrating the three iconic user interfaces 12, 22, 32 which comprise the respective workspaces according to the invention. As will be described in greater detail herein, the first graphical user interface 12 comprises an initial Context Selection Workspace 13 that enables the expression of user context as part of a query in a manner optimized for ease of use; the graphical user interface 22 shown in FIG. 2 provides a Detailed Specification Workspace 23 including a visual representation of multi-dimensional data for expressing query and results that enables users to completely manage their search in a manner optimized for simplicity and clarity of logic; and, the graphical user interface 32 is directed to a Results Display Workspace 33 that enables expression of relevance of results in terms of user context in a manner optimized to facilitate resource selection using user supplied decision criteria. Aspects of interfaces 12, 22 and 32 shown in FIG. 2 are described in greater detail in commonly-owned, U.S. patent application Ser. No. 09/778,136, now published entitled CUSTOMER SELF SERVICE ICONIC INTERFACE FOR PORTAL ENTRY AND SEARCH SPECIFICATION and additionally in commonly-owned, U.S. patent application Ser. No. 09/778,147 now U.S. Pat. No. 6,693,651 entitled CUSTOMER SELF SERVICE ICONIC INTERFACE FOR RESOURCE SEARCH RESULTS DISPLAY AND SELECTION the contents and disclosure of each of which are incorporated by reference as if fully set forth herein.

Referring back to FIG. 1, there is depicted a conceptual control flow 10 for the customer self service resource search and selection system according to a preferred embodiment. Via the three-part intuitive graphic user interface (GUI) users are enabled to enter queries and manipulate the system's responses according to their resource needs. Behind the scenes, as will be described, is a set of sub-system components that cooperate to derive, assume, sense and infer particular user contexts with minimal user effort. These components include databases such as: 1) a Context Attributes Master database 14 which stores the definitions of all the attributes known to the system and their relationships to predefined user contexts; 2) an Attribute Value Functions database 16 which stores the definitions and logic associated with assigning a value to an attribute for specific instances (context default, groups of users); 3) a Resource Indexing Functions database 18 which stores the definitions and logic for mapping specific resources to specific context sets; and, 4) a historical User Interaction Records database 15 which stores the users' prior queries, responses, and interactions with the system 10. The first three databases are created before system startup and the User Interaction Records 15 is created with the first user/use of the system, however, it is understood that all four databases are maintained and enhanced through system operations described below.

First, prior to a user signing on to the system, and before the user first views the iconic interface 12, the system 10 performs several pre-processing steps including: 1) creating of an empty "user context vector" 25 and populating the context vector with minimal information from external data elements 11 integrated with the system or, from system sensing/discovery; and, 2) processing the minimal user context vector 25 against the Context Attributes database 14, the Attribute Value Functions database 16, and the User Interaction Records database 15 using context classification logic to result in a "suggestion" that this particular user may be classified into one of a small number of user context definitions from the system's predefined long list of context definitions. After these pre-processing steps, the first iconic interface 12 is then displayed for the user at the user's terminal, or web-browser, in the case of resource searches conducted over a web-based communication link. The iconic Context Selection Workspace 13 initially displays a small set of User Context Icons it has determined are most appropriate, captures the user's selection of the one that seems most fitting for the current user search session, and captures the user's actual query. In most cases, this minimal entry will suffice to begin the search because the system has already determined the relevant attributes, default values and parameters to drive the system forward through the user search without any additional entry on the user's part. However, if the user wishes to review their defaults or to fine tune some context or resource variables, there is an option to proceed to the iconic Detailed Specification Workspace display 22 before starting the search.

Regardless of the screen navigation path chosen, when the user initiates the query, the system 10 packages the user query with a detailed User Context Vector 25 summarizing what is known of the user's needs at this point. Once the search is initiated, the query and context vector are processed sequentially through three distinct sub-processes: 1) a Classifying User Contexts sub-process 24; 2) an Adaptive Indexing of Resource Solutions and Resource Lookup sub-process 28; and, 3) a Response Set Ordering and Annotation sub-process 34.

Particularly, the Classifying User Contexts sub-process 24, receives as input the user query and the raw context vector 25 and External User Data 11, and processes these against the User Interaction records 19 for this user/user group, data from the Context Attributes Master 14 and Attribute Value Functions 16. The system classifies this specified user interaction state and annotates the context vector 25' with a complete set of context parameters for use in subsequent processing. The Classifying User Contexts sub-process 24 particularly applies an inductive learning algorithm as an attempt to predict derived contexts. Additionally, the Classifying User Contexts sub-process 24 updates the Attribute Value Functions database 16 with more enhanced functions. The actual processing via Context Classifier and Context Applier is described in greater detail in commonly-owned, co-pending U.S. patent application Ser. No. 09/778,378, pending, entitled CUSTOMER SELF SERVICE SUBSYSTEM FOR CLASSIFYING USER CON- TEXTS the contents and disclosure of which are incorporated by reference as if fully set forth herein.

As the customer self service system is provided with functionality enabling a user to "bookmark" their stopping point in a prior session and to resume with a "work-in-process" data set, the initial settings may be modified based upon system discovery or user override at the time of inquiry, resulting in the raw contexts associated with the user's current inquiry transaction. It is this raw context data which serves as input to the context classifier sub-process 24.

The Adaptive Indexing of Resource Solutions and Resource Lookup sub-process 28 receives as input the user query and the context vector 25' and processes them against a Resource Library 42, the User Interaction Records for this user/user group 19, and the Resource Indexing Functions 27. This sub-process particularly maps specific contexts to specific resources so as to increase the relevance of search results for a given user in their current context without requiring the user to explicitly train the system. The primary output of the Adaptive Indexing of Resource Solutions and Resource Lookup sub-process 28 is a newly identified Resource Response Set 35 which is input to the Response Set Ordering and Annotation sub-process 34. The Adaptive Indexing of Resource Solutions and Resource Lookup sub-process 28 additionally generates a secondary output which comprises updates to the Resource Indexing Functions database 18 with yet more enhanced functions 27'. Further details regarding the Adaptive Indexing and Resource Lookup sub-process 28 may be found in commonly-owned, co-pending U.S. patent application Ser. No. 09/778,135 now U.S. Pat. No. 6,665,639 entitled CUSTOMER SELF SERVICE SUBSYSTEM FOR ADAPTIVE INDEXING OF RESOURCE SOLUTIONS the contents and disclosure of which are incorporated by reference as if fully set forth herein.

The Response Set Ordering and Annotation sub-process 34 receives as input the User Context Vector and Resource Response Set 35 and processes it against data from an Annotation Scoring Metric database 46 and User Interaction Records 19 for the particular user/group. This sub-process 34 weights and ranks the potential responses according to the resource selection criteria specified by the user on the Detailed Specification Workspace described herein, and takes into consideration the scoring metric. The sub-process 34 additionally tags the response set with data elements necessary for display and manipulation on a visualization system, including, but not limited to, the Results Display Workspace 32 described in the co-pending U.S. patent application Ser. No. 09/778,147 and particularly generates as output an Annotated Resource Response Set 38. Further details regarding the Response Set Ordering and Annotation sub-process 34 may be found in commonly-owned, published, U.S. patent application Ser. No. 09/778,139 entitled CUSTOMER SELF SERVICE SUBSYSTEM FOR RESPONSE SET ORDERING AND ANNOTATION the contents and disclosure of which are incorporated by reference as if fully set forth herein.

As mentioned, the ordered and annotated set of resources that the system has found to best match the user's initial query and related subject and context variables may be utilized to drive a visualization system, including but not limited to, the intuitive iconic interface 32 for visualizing and exploring the response set as will be described in greater detail herein. This Results Display Workspace provides an interface that enables the user to continue working to learn about the resources suggested (detail/preview), narrow their results (selection) or redisplay them in a more meaningful view for decision making (graphically). In most instances, that will suffice. However, should the user wish to further refine their query, tune or override their current or default settings, that option is also available by navigating back to the Detailed Specification Workspace interface 22. If the user needs to start over, including selection of a new user context, it will be necessary to navigate back to the initial Context Selection Workspace 13.

As the user works with the system, particularly through the Results Display Workspace 32 and the Detail Specification Workspace 22 his/her interactions are captured and stored in the User Interaction Records database 15. Thus, in addition to the user query, context vector and response data set, the system retains adjustments to user context, results display manipulation, and results viewing and selection behavior 51.

Having completed the transaction, there is one more sub-process which is essential to this system: the sub-process for Context Cluster Discovery and Validation 48. This batch process, occurring asynchronously and constantly, applies unsupervised (machine) learning to cluster user interaction records and to assist in the identification of new user contexts, attribute value functions and resource indexing functions. The User Interaction Records 19 are processed against the Context Attributes Master database 14, the Attribute Value Functions database 16 and the Resource Indexing Functions database 18 and a Distance Metric 44 which helps determine "how close is close", i.e., "what's good enough" for a variety of factors. When validated by a system administrator, additional user contexts may be implemented (manually or semi-automatically) in the databases and visibly as new icons on the Context Selection Workspace 13.

Particularly, the Context Cluster Discovery and Validation sub-process 48 periodically analyzes user interaction records 19 of User Interaction Records database 15, documents its "discoveries" of user interaction "clusters", and presents them to a system administrator tool for consideration. Clustering, in machine learning terminology, refers to the grouping of data based upon the frequency of occurrence within the data itself, as opposed to the classification of data based upon previously established examples.

Figure 6:
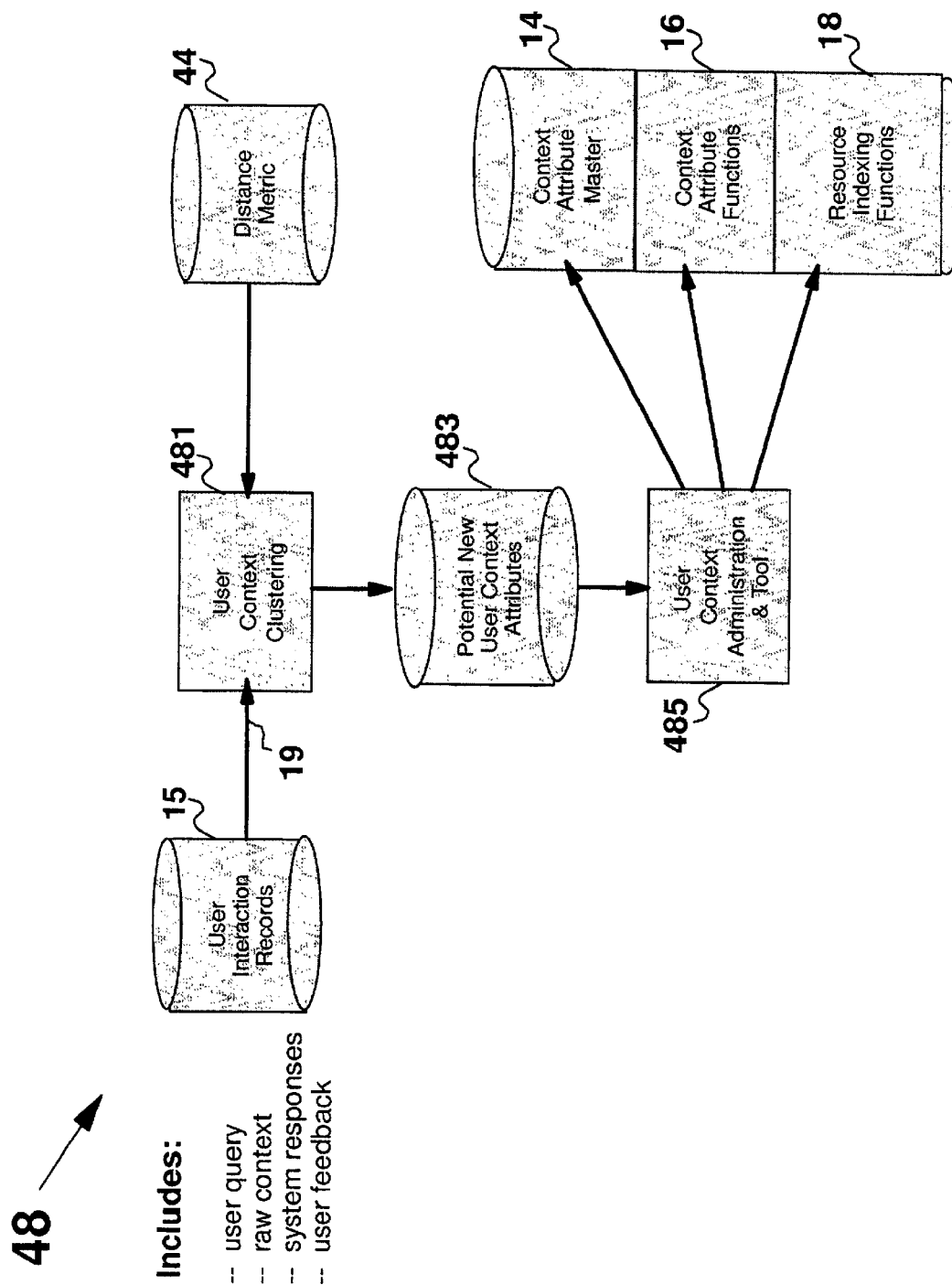
FIG. 6 depicts the overall process of discovering, and validating new user context terms according to the preferred embodiment of the invention.

FIG. 6 depicts the overall process of discovering, and validating new user context terms. In a first step of the process, a user context clustering process 481 receives user interaction records 19 that include traces of previous interactions with users of the system including: all types of raw context information, whether it be static, historical, or transient, organizational or community context, environment context, or any other context associated with the user and dependent upon that user's interaction state and query domain, e.g., education, real estate, travel, etc. user queries, the system's responses, and user feedback. It is understood that user interaction records 15 are captured at several points in the overall system: For example, the context vector is captured initially, along with identifying information about the user, time and source location of the query. The annotated response set is captured after the ordering step during the query, along with transaction identifying information linking it to the initial context vector and any revised context vectors generated before this transaction is completed. The user's entries and overrides through the iconic interfaces to the system are captured when interfacing with the system via the Context Selection Workspace 13 of iconic interface 12 and, the Detailed Specification Workspace 23 of iconic interface 22, and users' cursor movements and actions taken are captured during resource display, preview and selection. Implementing a well-known unsupervised clustering algorithm, the process 481 clusters these interaction records according to an externally specified distance metric 44 which defines how similar two user interactions are. For example, the clustering may focus on how similar the result sets are given that this is the part of the user interaction that contexts are being used to predict. Similarity of other aspects of the user's interaction, for example, bandwidth of user's connection might be an aspect of the user's raw context that might be relevant to clustering user interactions as well. Thus, the distance metric 44 measures distance with respect to all of these parameters of the user interaction records.

The output of the clustering process 481 is a set of potential new context attributes 483 with each potential attribute comprising a set of related user interactions. A user context administration tool 485 provides an interface, such as a browser, for enabling a human administrator to view these sets and, when appropriate, to create new context attribute names and associated attribute values in the Context Attributes Master database 14. These context attributes and values serve as training data for the context classifier sub-process as described in the commonly-owned, co-pending U.S. patent application Ser. No. 09/778,378. The next time the classification of user contexts is executed, the system will find the newly created context attributes and their associated values, and identify and codify the associated data, including that for the current transaction, that which updates context functions, and that which will be captured in user interaction records from that point forward. All of these additional classifications improve the ease of use, accuracy, and predictability of the system over time.

In addition, the User Context Administration tool 485 may be used, optionally, by the administrator to update the Context Attribute Functions 16 (i.e., those functions, formulae or neural nets, etc., providing ways of inferring attribute values automatically) and the Resource Indexing Functions 18 (i.e., those rules, formulae, neural nets, indexes, etc. providing automatic linkage of resources to a specific query). For the purpose of this invention the terms rule and function are used interchangeably. Both refer to any data structure that can be executed by an interpreter in a way as to compute a set of labeled output values given a set of labeled input values. An example of an arithmetic rule is "Fahrenheit<–Centigrade *5/9+32". Rule languages include but are not limited to: neural nets, decision trees, functional languages, polynomial functions. Without explicit human intervention using this tool, the system will ultimately discover the functions that serve the user population. But in some uses of this system, there may be advantages in start-up accuracy, learning efficiency, or policy enablement to providing some "functions" to the system.

The customer self-service system and the interaction with the system through the iconic interfaces of FIGS. 4 and 5, will be described with respect to example domains such as education, travel and real estate, and further will be described from the point of view of the following users: a learner, a traveler and a real estate transactor, e.g., renter/buyer. In describing the user's interaction with the system through the iconic interfaces, a set of data elements used in the system and their characteristics are first defined as follows:

Query: an entry field for entering search data by using text or voice methods, for example, but not limited to these methods User Context: a User Context represents a predefined set of context attributes which are relevant to the search behavior/needs of a group of people.

More particularly, the User Context enables the packaging of a rich set of attributes about the user with a rich set of attributes about their searching and execution environment in response to "one click" of an icon for the user presented via the interface. While there are potentially a large number of potential user contexts for any user population, each individual user would likely settle on a small number that apply to them in different circumstances. The naming of these contexts is important so that the user may recognize him/herself as potentially fitting into that group. The attributes associated with a particular user context are predefined by system administration and cannot be modified by the user. Over time, the system will identify changes to the attribute set that will make a particular user context perform better for its repeated users. Over time the system will detect different attribute sets which appear to predict user needs/behaviors and might suggest new user contexts for the system.

Context Attribute: An attribute is used to describe a characteristic associated with the User Context.

There are potentially an unlimited number of attributes defined to the system with a master list maintained in the Context Attributes Master File. New attributes are discovered and added with system administrator validation. End users may not modify the definition of a context attribute, nor its' packaging into user contexts, nor the list of values associated with each.

Attribute Value: A list of attribute value choices is predefined for each context attribute.

The system sets a default value to each attribute based upon data lookup, sensed, or historically derived from prior user entry or behavior. Either the system or the user may modify the value initially set based upon explicit preferences or observed behavior. This value is added to the context vector used for resource lookup, and is retained in the historical User Interaction Records database 15 so it may be used to set default values for each individual each time they use the system.

Value Resource Parameters: Parameters defined in terms of inclusion and exclusion that may be used as a filter to increase the relevance of the response set.

That is, with the basic search logic established, the user's query may be satisfied. However, the response set may contain a large number of resources which are not satisfactory to this individual. Value Resource Parameters defined in terms of inclusion and exclusion may be used as a filter to increase the relevance of the response set. The inclusionary parameters may be easier to establish by users new to the system and that exclusionary parameters will become more evident as users gain experience in working with the response sets.

Resource Selection Criteria and Value Ranges: Parameters and specifications for ranking a user's response set to enable more informed resource selection.

Thus, even with the degree of specificity enabled by the system, and even with the constant improvement in search relevance/efficiency as it relates to user contexts, there usually may be more than one resource to present to the user (in fact, if the search is too narrow, the user may miss the opportunity to explore/discover different approaches to meeting their actual needs). As most users know (or think they know) the criteria they will apply to selecting between options, a limited set of resource selection criteria are provided by the system (the set would differ by domain). However, via an interactive graphical display provided by the iconic interface of the invention, the user may now specify acceptable value ranges and relative weighting of each criteria for ranking their response set and/or may customize the use of these criteria.

When the actual response set data is offered, most users face the reality of many options, few options, more subjective information about specific resources; and they may make tradeoffs around the selection logic. For example, the response set may be refreshed as the user may decide to eliminate a criteria, change the weight of a criteria, or change the acceptable value ranges for a criteria. From these specifications, accessible via the iconic interface of the invention, the user may determine for example, whether time, timing, flexibility, and risk may be sacrificed in order to bring the cost down below a certain dollar ($) value, and, for example, determine how much more would the user need to pay to get exactly what he/she wants exactly when he/she wants it.

Figure 4:
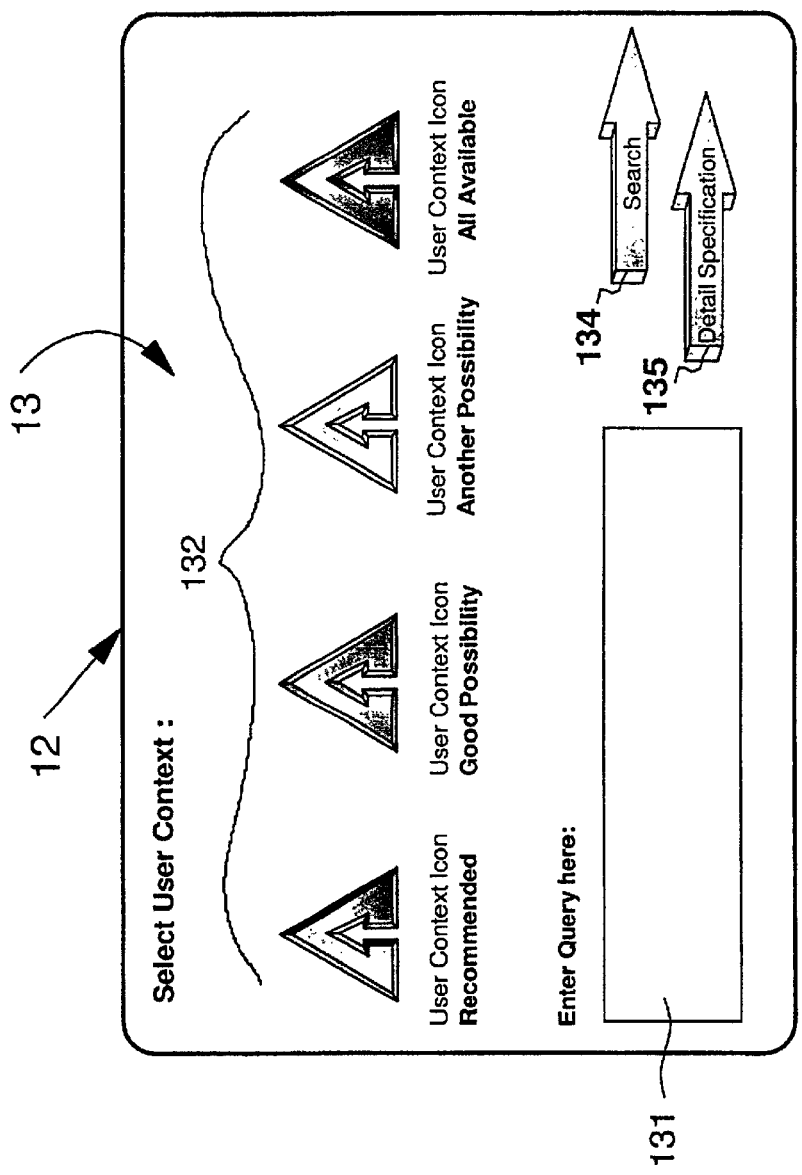
FIG. 4 illustrates the first Graphical User Interface 12 including the Context Selection Workspace 13.
Figure 5:
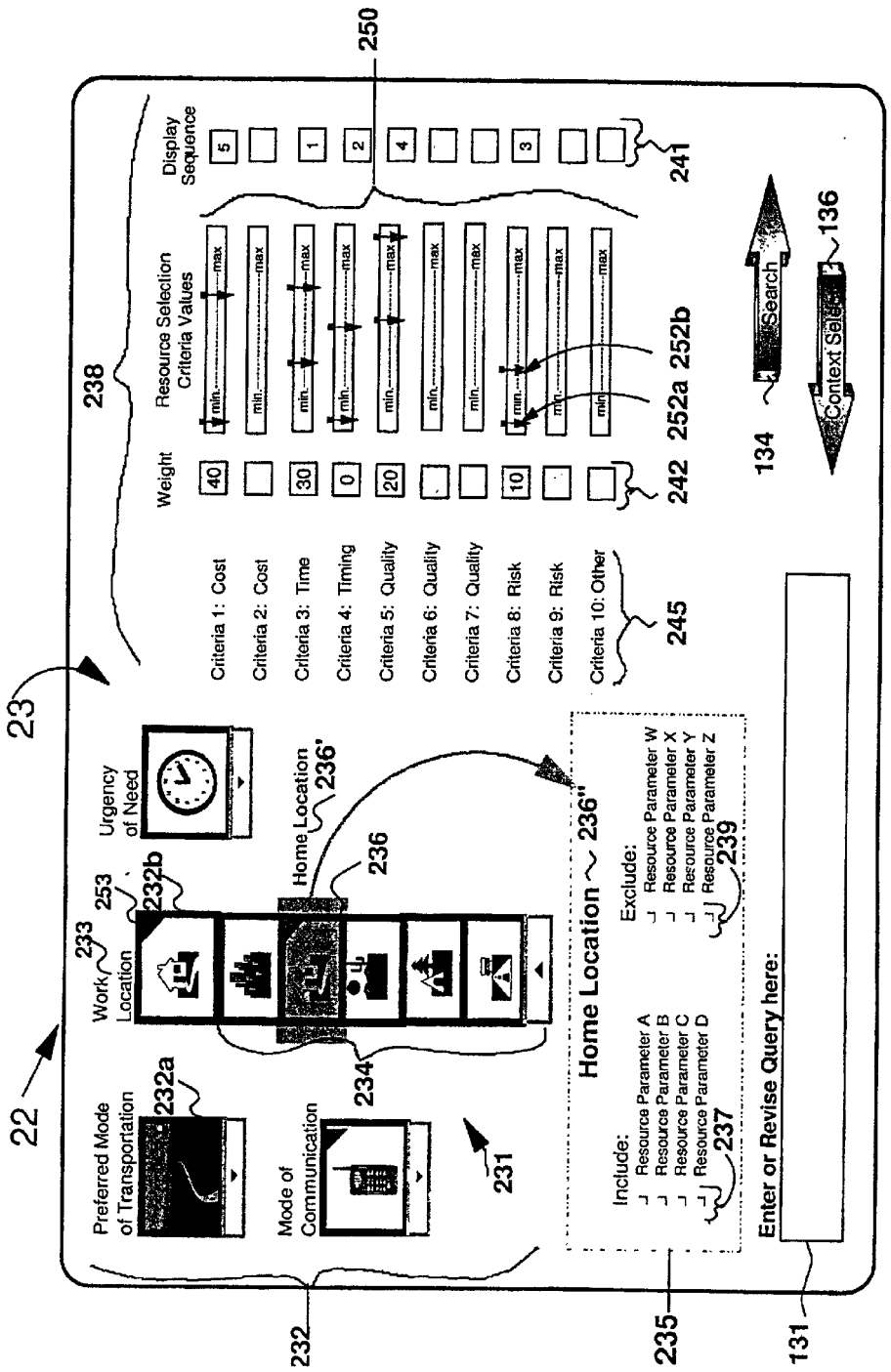
FIG. 5 illustrates the second Graphical User Interface 22 including the Detail Specification Workspace 23.

FIGS. 2, 4 and 5 depict in greater detail the iconic interfaces for the customer self service system that enable the use of a rich set of assumed, sensed, inferred, and derived contexts with minimal user effort.

With initial logon, as shown in FIG. 2, the system first presents a set of user contexts which are available to the user via the simplified iconic interface 12 of FIG. 2. The system will suggest one context over the others, but the user may select the one most appropriate to their current situation. In each session, the user selects only one user context to use, however over time each user may discover that a couple of different user contexts serve their needs in differing circumstances. On this screen 13 particularly, the user then enters a query via one or more methods including text via a web browser display interface, for example, or via voice, for example, with help of voice recognition software. It should be understood however, that query entry is not limited to these types of methods. The user will then initiate a lookup and proceed either to a third process step (via most direct path 52) for viewing a search result response set via the Results Display Workspace interface 32, or, proceed to a second step (via path 50) to optionally refine/override search variables via the Detail Specification Workspace interface 22.

FIG. 4 illustrates in detail the first graphical user interface 12 including the initial Context Selection Workspace 13 that enables the expression of user context as part of a query. As shown in FIG. 4, the Context Selection Workspace 13 includes: a series of one or more selectable User Context Icons 132 presented to the user for selecting user contexts; and, a Query Entry Field 131 enabling user entry of search terms via text or voice entry, for example. In accordance with the principles of the invention, the User Context Icons 132 are graphical user interface elements from which the user selects the one context most representative of his/her current situation. The icons presented in this interface each represent a packaging of sets of attribute-value pairs which describe a kind of user in a particular situation. Particularly, a user context represents a predefined set of context attributes which are relevant to the search behavior/needs of a group of users. For example, as described herein, context may include aspects of the user's knowledge, their relationship to organizations and/or communities, their user environment(s), and their resource need. All of these combine to provide a rich context surrounding the actual query which can significantly improve the outcome of the search through resources.

The Context Selection Workspace 13 thus enables the expression of user context as part of the query and is optimized for ease of use. Particularly, the user selects from one or more of the several displayed context icons 132 by clicking on them. A context "applier" pre-process described in commonly-owned, co-pending U.S. patent application Ser. No. 09/778,378 is invoked at each session initiation for a user's search transaction, using a minimal or null user data set to produce defaults for user context, attributes, values, and resource parameters for the initial display of the Context Selection Workspace 13. This pre-processing step delivers additional benefits to the user by ensuring the use of the most current data and functions operating in the system. After making the initial query entry, by selecting hyperlink 134, the user is able to initiate the search and proceed directly to the third interface 32 which displays the actual search results. Alternately, by selecting hyperlink 135, the user may proceed to the second interface 22 having the Detail Specification Workspace 23 for further query editing and/or context refinement.

Returning to FIG. 2, with respect to the second step, the user is able to fine tune or override context attribute values, value resource parameters, and resource selection criteria and value ranges, using a drag and drop interface, iconic pulldowns, and/or slide buttons. The user may return to this screen as many times as needed to find a suitable response set. Particularly, via the second iconic interface 22, the User Context selected in the first step has been made explicit by its default settings on all the iconic interface elements listed. Thus, via a Detail Specification Workspace 23 the user may: 1) modify the query (via text entry or voice, for example); 2) change the value of attributes associated with the user context (using pull down menus); alter the value resource parameters (e.g., include/exclude) using checkboxes; 3) customize the subset of responses by altering the resource selection criteria, including the weighting of criteria and the ordering of criteria on the final display, (e.g., using checkbox and/or numeric entry); and, 4) further refine the selection by specifying minimum/maximum acceptable value ranges for resource selection criteria through drag and drop of "tabs" on sliders, for example. After making the necessary adjustment, the user re-initiates the lookup and may proceed to the third step via path 51.

FIG. 5 illustrates in detail aspects of the second iconic graphical user interface 22 which enables the user to define or change all the parameters associated with their query 131 and (single) selected user context 132. As shown in FIG. 5, the graphical user interface 22 is divided into the following sections: a section for displaying the Query Entry field 131 as entered on the prior interface screen (FIG. 4) and available for editing; a section for displaying navigation arrows which allow the user to proceed with the search 134, or return to the initial Context Selection screen 136 via the first iconic interface to initiate a new query or select a different user context; and, a Detailed Specification Workspace 23 which is where all the search parameters can be explicitly viewed and modified. There are only two things the user cannot change from this screen: the user context selected (which they may change only on the Context Selection screen) and the context attributes which are linked to the user context (and which are predefined in the Context Attributes Master database 14).

As shown in FIG. 5, within the Detailed Specification Workspace 23 there comprises: an Attribute-Value Workspace 231, for enabling the user to change the attribute values for all the context attributes, represented as graphic elements 232, associated with the selected user context icon 132 (FIG. 4); and, a Resource Selection Criteria Workspace 238, for enabling the user to define the criteria 245 to be used in evaluating resources, define minimum and maximum acceptable values provided on slider elements 250 corresponding to each criteria, specify the weight assigned to those criteria via selection boxes 242, and specify the positioning of those criteria in a graphical display of the resources selected via selection boxes 241. As will be described, FIG. 3 provides sample data for the context attribute, attribute value, value resource parameters, and partial resource selection criteria from different domains which may be represented in the Detailed Specification Workspace 23.

With more particularity, the Detailed Specification Workspace 23 additionally includes the Value-Resource Parameter Workspace 235, for enabling the user to change or create resource parameters using include logic 237 or exclude logic 239 for any attribute value 232 selected in the Attribute-Value Workspace 231. More specifically, the Attribute-Value Workspace 231 includes graphical representations of all the context attributes 232 associated with the single (currently active) selected user context 132. Each context attribute 232 is displayed with a text title 233 for the attribute. The currently active attribute value for that context attribute is shown on each context attribute icon. In addition, if the user has substituted, as described below, a context attribute value different than the default value provided for this user session, a marker 253 is displayed on the corner of the context attribute icon. If the user "mouse clicks" on the context attribute element, e.g., icon 232b, the system displays a pull down menu 234 of graphic elements showing all the possible attribute values for this context attribute. If the user "mouses over" any of the values from pull down menu 234, e.g., attribute value 236, a textual description 236' supporting the element may appear. By selecting a context attribute element from the pull down menu 234, e.g., element 236 shown highlighted in FIG. 5, the user is enabled to fine tune their selected context based upon their current situation. If the user "mouse clicks" on a value other than the current default, the new value is "selected" to substitute for the default. If the user "double clicks" on the attribute value, the system prepares the Value-Resource Parameter Workspace 235 for this single attribute value, as will be described. FIG. 3 provides sample data for context attributes and attribute values from different domains which may be represented in the Attribute Value Workspace 231.

In the Value-Resource Parameter Workspace 235, the user may change or create resource parameters using include logic or exclude logic for any context attribute value 232 selected in the workspace 231. Regarding FIG. 5, with more particularity, the Value-Resource Parameter Workspace 235 is displayed for one attribute value at a time and is only displayed when requested via a double click, for example, on one of the attribute values displayed in the attribute Value Workspace 231, e.g., attribute value 236. The Value-Resource Parameter Workspace 235 is a pre-formatted two-column space (dialog box) where the user may establish inclusionary resource filters via checkboxes 237 and/or exclusionary resource filters via checkboxes 239, based upon pre-established resource characteristics 236" for that selected attribute value. The value resource parameter data elements are pre-set by the user's known context, prior history of selecting from resources identified by the system, and potentially by corporate/organizational policy implemented through the system. By making these additional specifications, the user is enabled to increase the relevance of the resource response set based upon their current situation and personal preferences. When finished with these specifications, the user may double click to close this box 235 and return to the Attribute Value Workspace 231. This step can be repeated for as many attribute values as the user would like to refine and may be executed either before or after the search is conducted. Value resource parameter data elements associated with context attributes for different domains, are provided in FIG. 3 as samples of data which may be represented in this Value-Resource Parameter Workspace 235.

Regarding FIG. 5, with more particularity, the Resource Selection Criteria Workspace 238 includes a list of criteria 245 which may be used in evaluating resources. This list, provided by the system, is customized by domain; but in all domains, it involves criteria including, but not limited to issues such as: cost, time, timing, quality and risk associated with using a particular resource to satisfy the user's specific need. The initial system default might be to use all criteria and weight them equally. Over time, however, the default criteria may be set by the system based upon user context, user prior transaction history and user behavior on prior searches. If the user wishes to further reduce the set of criteria, they may do so by assigning a weight, for example a percentage weight, to each criteria they want used in the entry boxes 242. Along with each of the criteria selected there exists a range of acceptable values specified on an associated individual slider element 250. The initial system default, may be "unlimited" and then, may be set over time based upon user context, use and behavior. Additionally, the user may use drag and drop tabs 252a,b on the slider element 250 to set a minimum and/or maximum value for the associated resource selection criteria. It is understood that the unit of measure on the sliders may vary by criteria. Further, via entry boxes 241, the user may select to view via "check" or specify via number entry the display sequence of these criteria when arrayed as the axes on an n-dimensional graphic display provided in the Results Display Workspace via graphic interface 32 as described in commonly owned, co-pending U.S. patent application Ser. No. 09/778,147 or when viewed on another visualization system.

The Detailed Specification Workspace 23 thus provides full disclosure of system defaults and enables the user to completely manage their search.

Referring back to FIG. 2, with respect to the third step, a display of the annotated response set is provided in a form ready for preview or selection as described herein. The user may rework this screen as many times as needed to better understand and make decisions about resource(s) to use. More particularly, via the Results Display Workspace 33 the user may: 1) view the response set, ranked by the aggregate value and weighting as defined by resource selection criteria and value ranges; 2) select one or many of the ranked responses for graphical display in multi-dimensions along the multiple axes of the resource selection criteria; and, 3) initiate a "roll over" of one or more resources from either the ranked list or the graphical display to view detailed descriptions or to "preview" the resource. If there are too many responses, too few, or if they are incorrect, the user may return to the second step to further refine/redefine, and re-execute the lookup. Alternately, the user may return to the first step to choose a different context for their search.

While the system is intended to operate on a fully enabled graphic workstation or personal computer, it is intended that search definition and the results visualization processes described herein may be operated by users of reduced graphics-enabled devices such as text screen workstations, Organizers, or any type of Personal Digital Assistants (PDAs). Accordingly, in alternative embodiments, all the context icons may have names, all the graphical displays may be reduced to lists, all the pull downs may be viewed as indented lists or secondary screens, and all the min-max sliders may convert to fill-in boxes. Further, as mentioned, the customer self service system described herein is applicable to many applications including the domains of education, real estate, and travel. The generic process flow described with respect to FIG. 2, will now be described with specific examples from the education, real estate and travel domains as shown in FIG. 3.

With respect to the education domain, the user is a learner and FIG. 3 depicts an example interaction with the system through the iconic interfaces (FIG. 2) included in the embodiment of the invention as applied to the education domain. The three iconic workspaces of FIG. 2 enable the learner to specify example data elements, such as the example data elements depicted in the Education (e.g., Environmental) column 60 of FIG. 3, and view results, as follows: In the first process step, the learner uses the Context Selection Workspace (interface 12 of FIG. 4) to specify their query 61 as "Learn Lotus Notes at home." The learner may select the User Context "Remote Staffie", for example (where the icon's name is highlighted in FIG. 3), from among the available set of context icons 62. The learner may then elect to go to the Detail Specification Workspace (interface 22 of FIG. 5) in the second process step in order to view the context attributes 63 associated with the "Remote Staffie" User Context. Preferably, the default assigned context attribute value ("DSL", for example) for any context attribute ("Connectivity", for example) is visible on the context attribute icon ("Connectivity", for example, whose name is shown highlighted in FIG. 3). The learner may click on the context attribute "Connectivity" to see the menu of associated attribute values 64. The learner, for example, may select the "Disconnected" attribute value shown highlighted in FIG. 3. By double clicking on this attribute value the list of Value Resource Parameters, i.e., include/exclude filters 65, for the attribute value "Disconnected" is displayed. The learner, for example, may indicate that they want to include download and play resources and exclude online collaborative resources when searching for relevant resources. The learner may additionally specify resource priorities 66 by selecting, sequencing and weighting and specifying minimum and maximum values for relevant criteria such as cost, time, quality and risk on the Resource Selection Criteria Definition graphical user interface element on the Detail Specification Workspace (interface 22 of FIG. 5). In the third step of the process, the results of the learner's search are listed in the user view of the Results Display Workspace (interface 32 of FIG. 2). The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace to redefine their query or select a different User Context such as "Commuting Techie" via the first interface. The learner may additionally elect to return to the Detail Specification Workspace of the second interface to change the default value of the context attribute "Connectivity" from Disconnected to Dial-up and add or remove Value Resource Parameters for the attribute value Dial-up or other context attribute values associated with context attributes such as "Learning Mode" or "Technical Field". The learner may also change their selection criteria, the weighting of the selection criteria, and the minimum/maximum values for any selection criteria, in hopes of identifying additional relevant resources.

With respect to the education domain, the user is a "learner" however, the three iconic workspaces of FIG. 2 provide the process for enabling the learner to specify example data elements, such as the example data elements depicted in the Education (e.g., Subject Matter) column 70 of FIG. 3, and view results, as follows: In the first process step, the learner uses the Context Selection Workspace (interface 12 of FIG. 4) to specify their query 71 as "Become a Linux developer by June" for example. The learner selects the User Context "Commuting Techie" from among the available context icons 72. The learner may elect to go to the Detail Specification Workspace in order to view the context attributes 73 associated with the "Commuting Techie" user context. Preferably, the default assigned context attribute value ("Programming", for example) for any context attribute ("Technical Field", for example) is visible on the context attribute icon ("Technical Field", for example, whose name is shown highlighted in FIG. 3). In addition, the learner may click on the context attribute ("Technical Field, to stay with the example) to display a pull down menu to view the other values 74 (in either picture or word format) that could be assigned to this attribute. The learner, for example, may select "Graphical Interfaces" shown highlighted in FIG. 3. By double clicking on this attribute value, the list of Value Resource Parameters (include/exclude filters 75) for the attribute value "Graphical Interfaces" will be displayed. For example, the learner may indicate that they want to include the KDE interface and exclude the GNOME interface when searching for relevant resources. The learner may additionally specify resource priorities 76 by selecting, sequencing and weighting and specifying minimum and maximum values for relevant criteria such as cost, time, quality and risk on the Resource Selection Criteria Definition graphical user interface element on the Detail Specification Workspace. The results of the learner's search are listed on the Results Display Workspace via the interface 32. The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace 13 via the first interface 12 to redefine their query or select a different user context such as "Traveling Consultant." The learner may also elect to return to the Detail Specification Workspace via the second interface 22 to change the default value of the context attribute "Technical Field" from Graphical Interfaces to Programming and add or remove Value Resource Parameters for the attribute value Programming or other context attribute values associated with context attributes such as "Learning Mode" or "Connectivity." The learner may also change their selection criteria, the weighting of the selection criteria, and the minimum/maximum values for any selection criteria, in hopes of identifying additional relevant resources.

With respect to the real-estate domain, the user is a real estate transactor (renter/buyer) and FIG. 3 depicts an example interaction with the system through the iconic interfaces (FIG. 2) included in the embodiment of the invention as applied to the real estate domain. The three iconic workspaces of FIG. 2 enable a real estate renter or buyer to specify example data elements, such as the example data elements depicted in the Real Estate column 80 of FIG. 3, and view results, as follows: In the first process step, the renter or buyer uses the Context Selection Workspace to specify their query 81 as "Find housing near new job by August." The renter or buyer selects the user context "Relocating Business Professional" from among the available context icons 82. The renter or buyer may elect to go to the Detail Specification Workspace in the second interface in order to view the context attributes 83 associated with the "Relocating Business Professional" user context. Preferably, the default assigned context attribute value ("Subcontract it all", for example) for any context attribute ("Maintenance Style", for example) is visible on the context attribute icon ("Maintenance Style", for example, whose name is shown highlighted in FIG. 3). In addition, the renter/buyer may click on the context attribute ("maintenance style, to stay with the example) to display a pull down menu to view the other values 84 (in either picture or word format) that could be assigned to this attribute. Upon renter or buyer double clicking on attribute value "Do-It-YourSelf-er", for example, the list of Value Resource Parameters (include/exclude filters 85) for the attribute value "Do-It-YourSelf-er" is displayed. For example, as shown in FIG. 3, the renter or buyer may indicate that they want to include walls, paint and lawn mowing and exclude plumbing, electrical and landscaping when searching for relevant resources. The renter or buyer may additionally specify resource priorities 86 by selecting, sequencing and weighting and specifying minimum and maximum values for relevant criteria such as cost, time, quality and risk on the Resource Selection Criteria Definition graphical user interface element on the Detail Specification Workspace. The results of the renter or buyer's search are listed on the Results Display Workspace of the third interface 32 in which the renter or buyer may immediately select one or more of the listed real estate resources, request to see additional details on them, or request to see a response set graphic indicating the relative positioning of each resource along each of the axes (n-dimensions, relating to cost, time, quality and risk) specified earlier. If no acceptable housing resources were provided, the renter or buyer may return to the Context Selection Workspace to redefine their query or select a different user context such as "Empty Nester." The renter or buyer can also elect to return to the Detail Specification Workspace to change the default value of the context attribute "Maintenance Style" from Do-It-Yourself-er to Subcontract It All, for example, and add or remove Value Resource Parameters for the attribute value "Subcontract It All" or other context attribute values associated with context attributes such as "Mode of Commute to Work/School" or "Mode of Housing." The real estate transactor may also change their selection criteria, the weighting of the selection criteria, and the minimum/maximum values for any selection criteria, in hopes of identifying additional relevant resources.

With respect to the travel domain, the user is a traveler and FIG. 3 depicts an example interaction with the customer self service system through the iconic interfaces (FIG. 2) included in the embodiment of the invention as applied to the travel domain. The three iconic workspaces of FIG. 2 enable a traveler to specify data elements, such as the example data elements depicted in the Travel column 90 of FIG. 3, and view results, as follows: In the first process step, the traveler uses the Context Selection Workspace to specify their query 91 such as "Plan a trip to Vermont in June", for example. The traveler may then select the User Context Icon "Single Mom with kids", for example, from among the available user context icons 132, (where the icon's name 92 is highlighted in FIG. 3). The traveler may then elect to go to the Detail Specification Workspace in order to view the context attributes 93 associated with the "Single Mom with Kids" user context. Preferably, the default assigned context attribute value ("Drive", for example) for any context attribute ("Mode of Transportation", for example) is visible on the context attribute icon ("Mode of Transportation", for example, whose name is shown highlighted in FIG. 3). In addition, the traveler may click on the context attribute ("mode of transportation", to stay with the example) to display a pull down menu to view the other values 94 (in either picture or word format) that could be assigned to this attribute ("Fly" for example). The traveler selects "fly" as an alternative to "drive", as illustrated with highlighting in FIG. 3. By "overriding " this attribute value and double clicking on it, the list of Value Resource parameters (include/exclude filters 95) for the attribute value "Fly" is displayed. The traveler may indicate that he/she wants to include all major carriers and exclude prop planes and airlines with bad safety records when searching for relevant resources. The traveler may also specify resource priorities 96 by selecting, sequencing and weighting and specifying minimum and maximum values for relevant criteria such as cost, time, quality and risk on the Resource Selection Criteria Definition graphical user interface element on the Detail Specification Workspace. The results of the traveler's search are then displayed via the Results Display Workspace of the third iconic interface 32 of FIG. 2. The traveler may immediately select one or more of the listed travel resources, request to see additional details on them, or request to see a response set graphic indicating the relative positioning of each resource along each of the axes (n-dimensions, relating to cost, time, quality and risk) specified earlier. If no acceptable travel resources were provided, the traveler may return to the Context Selection Workspace in Step 1 to redefine their query or select a different user context such as "Swinging Singles." The traveler may also elect to return to the Detail Specification Workspace in Step 2 to change the default value of the context attribute "Mode of Transportation" from Fly to Train and add or remove Value Resource Parameters for the attribute value Train or other context attribute values associated with context attributes such as "Mode of Housing" or "Food Style". The traveler may also change their selection criteria, the weighting of the selection criteria, and the minimum/maximum values for any selection criteria, in hopes of identifying additional relevant resources.

Referring back to FIG. 1, the customer self service system implements an n-dimensional context vector 25', derived from the combination of user context and previous interaction with the system, to map specific contexts to specific resources. This increases the relevance of search results for a given user in their current context without requiring the user to explicitly train the system. Inferences and conclusions are made regarding both the individual user's preferred resource characteristics and those of a common set of users. These are used as input to the sub-processes described above and in greater detail in above-mentioned commonly-owned, co-pending U.S. patent application Ser. Nos. 09/778,135 and 09/778,139 to modify the iconic interfaces presented to each particular user for their subsequent search using the current invention as well as to modify the results that would be selected for presentation to the user via the interface described in 09/778,147 in response to an identical search. Over time, the system will improve in its ability to serve individual needs and evolve to an ability to suggest preferred answers to groups of users. The overall system also uses a batch background process described herein to cluster user interaction records to assist in the identification of new user contexts which serves to improve the system over time.

While the prior art has made use of adaptive learning in information retrieval systems, the overall customer self service system for resource search and selection enables the use of a large, rich set of contextual attribute-value pairs, is focused on learning about the user/user groups rather than the resources/resource groups and is able to discover user group characteristics and apply them to individuals. Much of the prior art is focused on the discovery of database structure, the clustering of data within the resources, or discovering relevant taxonomy for resources but the current system discovers contexts and context attributes among users which can be used predictively. The customer selfservice system of the invention uses a highly specialized and optimized combination of supervised and unsupervised logic along with both automated and semi-automated entry of learned results and is able to deliver higher value because contexts are used in a closed loop self improvement system; front end (entry) middle (search and display) and back end (results and user feedback) are integrated. Other systems apply machine learning at the front, middle, or back, but not integrated throughout. The current system identifies context classifications and functions, and applies them to individual users to reduce the burden of fully communicating their question and increasing the specificity and accuracy of a query's search parameters. The current system identifies and improves selection logic and identifies and improves response sets to common queries based upon a rich set of contextual variables. The current system additionally orders the response set, potentially further limiting it, and prepares the response set for display in a way that identifies the "best" resources for a particular user based upon the rich set of context variables. The display of the invention additionally illustrates the decision making characteristics of the alternatives presented.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A user context clustering system for a customer self service system that performs resource search and selection, said system comprising:
   a context attribute database comprising types of user contexts and one or more context attributes associated with each user context for processing by said system;
   a context attribute function database comprising funtions for computing values for each context attribute;
   a database of user interaction records including user interaction data; and,
   a processing mechanism for receiving said user interaction data including traces of previous user interactions with the system and including context information that is a function of said user including that user's interaction state, and receiving a distance metric for associating closeness of said user interaction data and, for performing unsupervised learning by clustering related aspects of multiple user interactions with said system from said user interaction data according to said distance metric to determine new user contexts and associated attributes for use in subsequent resource searches initiated by users in said system, wherein improved query definition and resource lookup results from said new determined user contrxt attributes due to user validation based on a combination of said unsupervised learning and supervised learning.

2. The user context clustering system for a customer self service system as claimed in claim 1, further comprising system administrator for updating said context attribute database with determined new user contexts and associated context attributes.

3. The user context clustering system for a customer self service system as claimed in claim 1, wherein said system administrator develops new context attributes and context attribute functions for computing values for said context attributes.

4. The user context clustering system for a customer self service system as claimed in claim 1, wherein said system generates new user interaction records with said determined new context attributes.

5. The user context clustering system for a customer self service system as claimed in claim 4, wherein said system administrator generates new context attribute names from said clustering, and assigns new records in said user interaction records database with values for those attributes, said updating context assignments serve as the training data for continuously improving said functions in said context attribute functions database.

6. The user context clustering system for a customer self service system as claimed in claim 1, wherein said distance metric includes determining closeness of parameters of said user interaction data, a closeness parameter including similarity of result sets of a user query.

7. The user context clustering system for a customer self service system as claimed in claim 1, wherein said system administrator develops new definitions and logic for mapping specific resources to specific context sets, and updating a database for storing said definitions and mapping logic.

8. The user context clustering system for a customer self service system as claimed in claim 1, wherein said user interaction data comprises past and present user queries.

9. The user context clustering system for a customer self service system as claimed in claim 1, wherein said user interaction data comprises system responses to said user queries.

10. The user context clustering system for a customer self service system as claimed in claim 1, wherein said user interaction data comprises raw context information including: one or more of static, historical context, transient context, organizational context, community context, and environment context.

11. The user context clustering system for a customer self service system as claimed in claim 10, wherein said user interaction data comprises other raw context associated with the user and dependent upon that user's interaction state and query domain.

12. The user context clustering system for a customer self service system as claimed in claim 11, wherein a query domain includes one of: education, travel and real estate.

13. The user context clustering system for a customer self service system as claimed in claim 1, wherein said user interaction data comprises user feedback.

14. The user context clustering system for a customer self service system as claimed in claim 1, wherein said processing mechanism for performing unsupervised learning implements an unsupervised clustering algorithm for clustering said user interaction data records.

15. A method for clustering user contexts in a customer self service system that performs resource search and selection, said customer self service system including a context attribute database comprising types of user contexts and one or more context attributes associated with each user context for processing by said system, and context attribute function database comprising functions for computing values for each context attribute, the method comprising the steps of:

a) receiving user interaction data including traces of previous user interactions with the system including context information that is a function of said user including that user's interaction state from among a database of user interaction records and a distance metric for associating closeness of said user interaction data; and, b) performing unsupervised learning by clustering related aspects of multiple user interactions with said system from said user interaction data according to said distance metric to determine new user contexts and associated attributes for use in subsequent resource searches initiated by users in said system, wherein improved query definition and resource lookup result from said unsupervised learning and supervised learning.

16. The method for clustering user contexts as claimed in claim 15, further comprising the step of: updating said context attribute database with determined new user contexts and associated context attributes.

17. The method for clustering user contexts as claimed in claim 15, further comprising the step of implementing a system administrator for developing new context attributes and context attribute functions for computing values for said context attributes.

18. The method for clustering user contexts as claimed in claim 17, further comprising the step of generating new user interaction records with said determined new context attributes.

19. The method for clustering user contexts as claimed in claim 17, wherein said clustering step b) includes the step of determining closeness of parameters of said user interaction data, a closeness parameter including similarity of result sets of a user query.

20. The method for clustering user contexts as claimed in claim 17, further comprising the step of developing new definitions and logic for mapping specific resources to specific context sets, and updating a database for storing said definitions and mapping logic.

21. The method for clustering user contexts as claimed in claim 17, further including the steps of:

generating new context attribute names from said clustering; and, assigning new records in said user interaction records database with values for those attributes, said updating context assignments serve as the training data for continuously improving said functions in said context attribute functions database.

22. The method for clustering user contexts as claimed in claim 15, wherein said clustering step b) of performing unsupervised clustering further includes the step of implementing an unsupervised clustering algorithm for clustering said user interaction data records.

23. A program storage device readable by machine, tangibly embodying a program of instructions executable by the machine to perform method steps for clustering user contexts for a customer self service system that performs resource search and selection, said customer self service system including a context attribute database comprising types of user contexts and one or more context attributes associated with each user context for processing by said system, and context attribute function database comprising functions for computing values for each context attribute, said method comprising the steps of:

a) receiving user interaction data including traces of previous user interactions with the system including context information that is a function of said user including that user's interaction state from among a database of user interaction records and a distance metric for associating closeness of said user interaction data; and, b) performing unsupervised learning by clustering related aspects of multiple user interactions with said system from said user interaction data according to said distance metric to determine new user contexts and associated attributes for use in subsequent resource searches initiated by users in said system, wherein improved query definition and resource lookup results from said new determined user context attributes due to user validation based on a combination of said unsupervised learning and supervised learning.

24. The program storage device readable by machine as claimed in claim 23, wherein said method further comprises the step of: updating said context attribute database with determined new user contexts and associated context attributes.

25. The program storage device readable by machine as claimed in claim 23, wherein said method further comprises the step of implementing a system administrator for developing new context attributes and context attribute functions for computing values for said context attributes.

26. The program storage device readable by machine as claimed in claim 25, wherein said method further comprises the step of updating said new user interaction records with said determined new context attributes.

27. The program storage device readable by machine as claimed in claim 25, wherein said clustering step b) includes the step of determining closeness of parameters of said user interaction data, a closeness parameter including similarity of result sets of a user query.

28. The program storage device readable by machine as claimed in claim 25, wherein said method further comprises the step of developing new definitions and logic for mapping specific resources to specific context sets, and updating a database for storing said definitions and mapping logic.

29. The program storage device readable by machine as claimed in claim 25, wherein said method further includes the steps of:

generating new context attribute names from said clustering; and, assigning new records in said user interaction records database with values for those attributes, said updating context assignments serve as the training data for continuously improving said functions in said context attribute functions database.

30. The program storage device readable by machine as claimed in claim 23, wherein said clustering step b) of performing unsupervised learning by clustering further includes the step of implementing an unsupervised clustering algorithm for clustering said user interaction data records.

* * * * *